(12) United States Patent
Stitou et al.

(10) Patent No.: US 10,874,985 B2
(45) Date of Patent: Dec. 29, 2020

(54) SYSTEM AND METHOD FOR PURIFYING LIQUID BY REVERSE OSMOSIS

(71) Applicant: CENTRE NATIONAL DE LA RECHERCHE SCIENTIFIQUE, Paris (FR)

(72) Inventors: Driss Stitou, Saint Nazaire en Roussillon (FR); Nathalie Mazet, Perpignan (FR); Sylvain Mauran, Millas (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 16/463,496

(22) PCT Filed: Nov. 22, 2017

(86) PCT No.: PCT/EP2017/080123
§ 371 (c)(1),
(2) Date: May 23, 2019

(87) PCT Pub. No.: WO2018/095999
PCT Pub. Date: May 31, 2018

(65) Prior Publication Data
US 2019/0366271 A1 Dec. 5, 2019

(30) Foreign Application Priority Data
Nov. 24, 2016 (FR) .................................. 16 61451

(51) Int. Cl.
*B01D 61/10* (2006.01)
*B01D 61/02* (2006.01)
(Continued)

(52) U.S. Cl.
CPC .......... *B01D 61/10* (2013.01); *B01D 61/025* (2013.01); *B01D 61/08* (2013.01); *C02F 1/441* (2013.01);
(Continued)

(58) Field of Classification Search
None
See application file for complete search history.

(56) References Cited

U.S. PATENT DOCUMENTS 4,983,305 A * 1/1991 Oklejas ................ B01D 61/022
210/321.66
6,139,740 A * 10/2000 Oklejas ................ B01D 61/022
210/321.66
(Continued)

FOREIGN PATENT DOCUMENTS

FR     2732727 A1    10/1996
JP     2010253344 A  11/2010

OTHER PUBLICATIONS

French Search Report from French Patent Application No. 1661451, dated Jul. 28, 2017.
(Continued)

*Primary Examiner* — Richard C Gurtowski
(74) *Attorney, Agent, or Firm* — Greer, Burns & Crain, Ltd.

(57) ABSTRACT

A system for purifying a treated liquid, including:
a treatment module, for treating the liquid and providing a purified liquid, and a residual liquid; and
a means for pressurizing said treated liquid to supply said treatment module, including:
a master cylinder, driven by a working fluid, and
at least slave cylinder, driven by said master cylinder, receiving said treated liquid and supplying it to said treatment module;
(Continued)

a cross section of said master cylinder is greater than a cross section of said slave cylinder so that, a greater pressure is generated on the treated liquid in the slave cylinder; and a means for pre-pressurizing the treated liquid, upstream of the pressurizing means, including:
- at least one master cylinder, connected to the treatment module, and driven by the residual liquid, and
- a slave cylinder, containing the treated liquid, driven by said master cylinder.

20 Claims, 5 Drawing Sheets

(51) Int. Cl.
| | |
|---|---|
| *B01D 61/08* | (2006.01) |
| *C02F 1/44* | (2006.01) |
| *F04B 9/125* | (2006.01) |
| *F04B 9/133* | (2006.01) |
| *C02F 103/08* | (2006.01) |

(52) U.S. Cl.
CPC .............. *F04B 9/125* (2013.01); *F04B 9/133* (2013.01); *B01D 2313/24* (2013.01); *C02F 2103/08* (2013.01); *C02F 2201/002* (2013.01)

(56) References Cited

U.S. PATENT DOCUMENTS

| | | |
|---|---|---|
| 6,804,962 B1 | 10/2004 | Prueitt |
| 2003/0015471 A1 | 1/2003 | Reichwein et al. |
| 2005/0170492 A1 | 8/2005 | Johnson et al. |

OTHER PUBLICATIONS

International Search Report from International Patent Application No. PCT/EP2017/080123, dated Mar. 20, 2018.

* cited by examiner

SYSTEM AND METHOD FOR PURIFYING LIQUID BY REVERSE OSMOSIS

The invention relates to a system for purifying liquid by reverse osmosis.

The field of the invention is the field of treatment of liquid to be purified, and more precisely the production of drinking water, by reverse osmosis, from water with high salinity or also heavily polluted water.

BACKGROUND

Several systems for purifying liquid to be treated use reverse osmosis, in particular water desalination systems. These reverse osmosis systems require the water to be treated to be brought to a pressure at least greater than its osmotic pressure in order to allow only water to permeate through a semi-permeable reverse osmosis membrane. Reverse osmosis systems generally use high-pressure pumps in order to increase the water pressure. However, these systems have high energy requirements.

Moreover, the reverse osmosis system proposed in the patent US 2003/0015471 A1 is known. This system incorporates a hydraulic device for increasing the pressure of the liquid to be treated. The hydraulic device comprises a slave cylinder containing the liquid to be treated, driven by a master cylinder containing a working fluid which can be pressurized by a heat source such as a solar thermal collector. The cross section of the slave cylinder is greater than the cross section of the master cylinder. The hydraulic device thus brings the pressure of the liquid to be treated to a pressure less than the pressure of the working fluid. Consequently the pressure of the working fluid is always greater than the osmotic pressure of the liquid to be treated. However, the energy consumption depends on the osmotic pressure of the liquid to be treated, in particular the salt content of the water. This system is thus not suitable in the case of treatment of water with a high salt content, such as seawater, because it would be necessary to bring the liquid to be treated, and thus the working fluid, to very high pressures, which involves high energy consumption and a low energy efficiency, thus a high purified liquid production cost.

A purpose of the present invention is to overcome these drawbacks.

Another purpose of the invention is to propose a system for purifying a liquid by reverse osmosis, having reduced energy consumption compared with the systems of the state of the art, for a given osmotic pressure.

Another purpose of the invention is to propose a system for purifying a liquid by reverse osmosis, using a lower-pressure working fluid compared with the systems of the state of the art.

Another purpose of the invention is to propose a system for purifying a liquid by reverse osmosis, making it possible to treat liquids having higher osmotic pressures compared with the systems of the state of the art, for a given energy consumption.

SUMMARY

At least one of the abovementioned objectives is achieved by a system for purifying a liquid, referred to as liquid to be treated, in particular salt water, comprising:
- a module, called treatment module, for treating the liquid to be treated and supplying on the one hand a liquid, called purified liquid, and on the other hand a liquid, called residual liquid; and
- a means for pressurizing said liquid to be treated in order to supply said treatment module, comprising:
  - a cylinder, called master cylinder, provided to be driven by a fluid, called working fluid, and
  - at least one cylinder, called slave cylinder, driven by said master cylinder, provided to receive said liquid to be treated and supply it to said treatment module;

characterized in that the cross section of said master cylinder is greater than the cross section of said at least one slave cylinder so that, for a given pressure of said working fluid in the master cylinder, a greater pressure is generated on the liquid to be treated that is in the slave cylinder.

With the system according to the invention, the cross section of the master cylinder containing the working fluid is greater than the cross section of the slave cylinder containing the liquid to be treated. The pressure of the liquid to be treated at the outlet of the slave cylinder is thus greater than the pressure of the working fluid. This makes it possible to bring the pressure of the liquid to be treated to a pressure greater than its osmotic pressure for a lower pressure of the working fluid compared with the systems of the prior art.

Furthermore, the energy consumption of the system is further reduced by comparison with the systems of the state of the art for a given osmotic pressure of the liquid to be treated.

The cross-sectional area ratio in the pressurizing means makes it possible to bring the pressure of the liquid to be treated to higher pressures. The system according to the invention thus makes it possible to treat liquids with high osmotic pressures compared with the systems of the prior art for one and the same energy consumption.

Advantageously, the treatment module can be a module for treating liquid to be treated by reverse osmosis.

Alternatively, the treatment module can be a module for treating liquid to be treated by nanofiltration.

In an embodiment of the system according to the invention, the master cylinder can be a double-acting cylinder, and the pressurizing means can comprise two slave cylinders, situated symmetrically on both sides of the master cylinder, and driven by said master cylinder.

The use of a master cylinder, called main master cylinder, associated with two slave cylinders, called main slave cylinders, makes it possible to increase the yield of the system in terms of volume of liquid to be treated, because the main master cylinder is always in a working situation and is never to be found in a resting position.

The main slave cylinders can have an identical volume. The symmetrical arrangement of the main slave cylinders thus makes it possible to treat the same volume of liquid to be treated at each movement of the main master cylinder.

Advantageously, the main master cylinder and the main slave cylinders can be firmly connected and comprise a rod passing through them, equipped with the pistons of each main cylinder. This arrangement makes it possible to ensure the sealing and limit the friction of the pistons.

Each main slave cylinder can comprise a valve for suction and a valve for delivery of the liquid to be treated.

Alternatively, each main slave cylinder can comprise a single valve for the suction and the delivery of the liquid to be treated.

The main master cylinder can simultaneously drive both the main slave cylinders, one of the main slave cylinders pressurizing the liquid to be treated and the other main slave cylinder sucking in a volume of liquid to be treated.

Advantageously, the system according to the invention can comprise a means for pre-pressurizing the liquid to be treated, upstream of the pressurizing means.

For reasons of clarity of the document, the means for pre-pressurizing the liquid to be treated are hereafter called the primary pre-pressurizing means. This name does not imply any order of arrangement.

The primary pre-pressurizing means can be connected to a source of liquid to be treated and bring the liquid to be treated to an intermediate pressure, less than the osmotic pressure of the liquid and greater than the initial pressure of the liquid to be treated.

Advantageously, the pre-pressurizing means is supplied with the residual liquid provided by the treatment module.

Thus the energy yield of the system is optimized because the pressure of the residual liquid at the outlet of the treatment means, during a treatment half cycle, is utilized in order to increase the pressure of the liquid to be treated during a subsequent half cycle.

In an advantageous version of the system according to the invention, the primary pre-pressurizing means can comprise:
- at least one cylinder, called primary master cylinder, connected to the treatment module, and driven by the residual liquid provided by the treatment module, and
- a cylinder, called primary slave cylinder, containing the liquid to be treated, driven by said at least one primary master cylinder.

Preferentially, the primary pre-pressurizing means can comprise:
- two single-action primary master cylinders, alternately driven by the residual liquid provided by the treatment module, and
- a double-acting primary slave cylinder, containing the liquid to be treated, arranged between the two primary master cylinders and alternately driven by one of the primary master cylinders.

The primary slave cylinder can comprise two delivery valves and two suction valves connected to a source of liquid to be treated.

The two primary master cylinders can have an identical volume. The symmetrical arrangement of the primary master cylinders thus makes it possible to treat the same volume of liquid to be treated at each movement of one of said primary master cylinders.

When a primary master cylinder is driven by being filled with the residual liquid:
- said primary slave cylinder pre-pressurizes the liquid to be treated that it contained, and is again filled with liquid to be treated,
- the other primary master cylinder is emptied of residual liquid.

The primary master cylinders can be connected to a 4/2 pneumatic control distributor. The distributor makes it possible to alternate the operation of the primary master cylinders.

Advantageously, the primary master cylinders and slave cylinder can be firmly connected and comprise a rod passing through them, equipped with the pistons of each cylinder. This arrangement makes it possible to ensure the tightness and to limit the friction of the pistons.

In particular, the cross section of the primary master cylinders is less than the cross section of the primary slave cylinder.

Preferentially, the system according to the invention can comprise a reservoir, called intermediate reservoir, containing liquid to be treated at an intermediate pressure, at the outlet of the primary pre-pressurizing means. The intermediate reservoir can be connected to the pressurizing means in order to supply the latter.

In particular, the intermediate reservoir can be connected to the delivery valves of the primary master cylinders and to the suction valves of the main slave cylinders.

The intermediate reservoir stores liquid to be treated at an intermediate pressure and thus makes it possible to supply the pressurizing means with liquid to be continuously supplied at the intermediate pressure, in particular when the primary pre-pressurizing means is in its end position.

In an embodiment of the system according to the invention, the working fluid can be a compressible fluid, for example air, said system comprising a compression device, arranged upstream of the pressurizing means, and arranged in order to increase the pressure of the working fluid. In particular, the compression device can be a compressor, a wave-actuated piston by the swell, etc.

In an embodiment of the system according to the invention, the working fluid can be a thermal fluid, the pressure of which varies as a function of its temperature, said system comprising a thermal device, arranged upstream of the pressurizing means, and carrying out a heat exchange towards said working fluid, so as to increase its pressure.

The thermal device can be connected to the main master cylinder. The increase in the pressure of the working fluid drives the movement of the main master cylinder and thus of at least one main slave cylinder.

In particular, when the main master cylinder is fed with working fluid:
- one of said main slave cylinders is filled with liquid to be treated from the intermediate reservoir, for example, and
- the other of said main slave cylinders pressurizes the liquid to be treated that it contained.

A 4/2 pneumatic control distributor can be used downstream of the thermal device in order to direct the working fluid. Following the half cycle, the main master cylinder can be driven alternately in one direction then the other, thus alternately driving one of the main slave cylinders.

Advantageously, the thermal device can comprise an evaporator connected to a heat source provided in order to increase the pressure of the thermal fluid by evaporation. The heat source can comprise at least one solar collector, such as a solar thermal collector, preferably operating as a thermosiphon.

The thermal device can also comprise a condenser connected to a heat sink provided in order to reduce the pressure of the thermal fluid by condensation. The heat sink can be connected to the treatment module and cooled by the residual liquid at the outlet of said treatment module. The heat sink can also be connected to at least one primary master cylinder and cooled by the residual liquid at the outlet of the latter.

Furthermore, the thermal device can comprise a thermal fluid reservoir containing the thermal fluid in the liquid state.

Preferentially, the working fluid can be an incompressible fluid; the system according to the invention can comprise:
- a thermal device, arranged upstream of the pressurizing means, and carrying out a heat exchange towards a thermal fluid so as to increase the pressure of said thermal fluid, and
- a pressure transfer means, arranged between said thermal device and the pressurizing means, in order to transmit the pressure from said thermal fluid to the working fluid.

The working fluid can be a hydraulic liquid such as water or oil.

In a preferred embodiment version of the system according to the invention, the pressure transfer means can comprise:
- at least one cylinder, called transfer cylinder, connected to the pressurizing means, and provided to receive the working fluid, and
- at least one deformable volume, arranged in said transfer cylinder, and provided to receive the thermal fluid.

The deformable volume can be a mobile, rigid or flexible physical separation, driven by the thermal fluid and driving the working fluid.

Preferentially, the deformable volume can be a bladder, in particular elastic, arranged in a transfer cylinder.

The at least one bladder can be connected to the thermal device and be reversibly deformed as a function of the pressure of the thermal fluid. Thus, when the bladder is filled with the thermal fluid pressurized by the thermal device, it swells and consequently increases the pressure of the working fluid present in the cylinder; the working fluid is then pushed into the main master cylinder, and drives it in a first direction. In a symmetrical manner, when the bladder is emptied of the thermal fluid, it deflates; the pressure of the working fluid is released from the driving fluid and the working fluid is pushed back into the cylinder by the main master cylinder, which then moves in the opposite direction.

In particular, the pressure transfer means can comprise:
- a first transfer cylinder, provided to receive the working fluid, equipped with a first bladder arranged in said cylinder provided to receive the thermal fluid, and
- a second transfer cylinder, provided to receive the working fluid, equipped with a second bladder arranged in said cylinder provided in order to receive the thermal fluid.

The first cylinder is arranged in order to drive the main master cylinder in one direction and the second cylinder is arranged in order to drive the main master cylinder in the opposite direction. In order to do this, the first and second bladders are alternately filled and emptied, in turn, with the thermal fluid, so that when the first bladder is emptied, the second bladder is filled and vice versa. The working fluid is thus transferred from one cylinder to the other as a function of the movement of the main master cylinder.

Each of said bladders can be alternately connected to the evaporator and the condenser of the thermal device. In particular, the system according to the invention can comprise a 4/2 pneumatic control distributor arranged between the thermal device and said bladders. Said distributor makes it possible to connect one of said bladders to the evaporator while the other bladder is connected to the condenser and vice versa, in a controllable manner. Thus, one of the bladders can be at a lower pressure than the other bladder, producing the movement of the working fluid and thus of the main master cylinder in one direction in a controllable manner.

In particular, the thermal device can comprise two controllable valves arranged downstream of the condenser and the evaporator respectively, and connected to the 4/2 distributor. These valves make it possible to connect or isolate the evaporator or the condenser respectively, to/from one of the elastic bladders.

Advantageously, each cylinder can comprise an opening for the supply or removal of the working fluid, situated on the bottom part of said cylinder.

Similarly, each bladder can comprise an opening for the supply or removal of the thermal fluid, situated on the bottom part of said bladder.

Furthermore, the system according to the invention can comprise a device for increasing the temperature of the working fluid to a temperature higher than, preferentially close to, the evaporation temperature of the thermal fluid. This makes it possible to reduce the condensation of the thermal fluid on the internal wall of at least one bladder containing the thermal fluid at a high temperature. For example, this heating device can be the thermal device.

Alternatively, or in addition, the deformable volume comprising the thermal fluid can be arranged below the working fluid in the pressure transfer means. This arrangement allows for a simpler removal, by gravity, of the condensates of the thermal fluid that may form by condensation on the wall of this deformable volume.

Advantageously, the thermal fluid can be selected from the saturated or unsaturated C5- to C10-type hydrocarbons, or from the organic fluids (R134a, R236fa, R254fa, R600, R601, RC318, R1234yf) or mixtures of azeotropic or non-azeotropic organic fluids.

In an embodiment, the system according to the invention can comprise a thermal fluid pre-pressurizing means, arranged upstream of the thermal device.

The pre-pressurizing means, called secondary pre-pressurizing means, can be provided in order to bring the pressure of the thermal fluid to a pressure less or greater than the pressure of the thermal fluid at the evaporator and greater than its pressure at the condenser.

In particular, the thermal fluid reservoir can be arranged between the condenser and the thermal fluid pre-pressurizing means.

Preferentially, the secondary thermal fluid pre-pressurizing means can comprise:
- at least one cylinder, called secondary master cylinder, driven by the residual liquid provided by the treatment module, and
- a cylinder, called secondary slave cylinder, containing the thermal fluid, driven by said at least one secondary master cylinder.

The secondary pre-pressurizing means can use the pressure of the residual liquid at the outlet of the treatment module in order to pre-pressurize the thermal fluid.

In a preferred embodiment version of the system according to the invention, the secondary pre-pressurizing means can comprise:
- two secondary master cylinders, driven in turn by the residual liquid provided by the treatment module, and
- a secondary slave cylinder, containing the thermal fluid, driven alternately by one of the secondary master cylinders.

The secondary slave cylinder can comprise two suction valves connected to the thermal fluid reservoir and two delivery valves connected to the evaporator.

The two secondary master cylinders can have an identical volume. The symmetrical arrangement of the secondary master cylinders thus makes it possible to treat the same volume of thermal fluid at each movement of one of said secondary master cylinders.

When a secondary master cylinder is driven by being filled with the residual liquid:
- the secondary slave cylinder pre-pressurizes the thermal fluid that it contained, and is again filled with thermal fluid originating from the thermal fluid reservoir,
- the other secondary master cylinder is emptied of residual liquid.

The secondary master cylinders can be connected to a 4/2 pneumatic control distributor. The distributor makes it possible to alternate the operation of the secondary master cylinders.

Advantageously, the master cylinders and the slave cylinder can be firmly connected and comprise a rod passing through them, equipped with the pistons of each cylinder. This arrangement makes it possible to ensure the tightness and to limit the friction of the pistons.

Furthermore, the secondary master cylinders can be connected to the heat sink in order to cool the condenser with the residual liquid at the outlet of one of the secondary master cylinders.

In particular, the system according to the invention can comprise a device for adjusting the flow rate of residual liquid in order to control the speed of the movements of the primary and secondary master cylinders respectively. This device can comprise an adjustable valve arranged downstream of an adjuster or of a downstream pressure reducer, acting on the flow rate of the residual liquid at the outlet of the pre-pressurizing means.

The device for adjusting the flow rate can be arranged downstream of the thermal device, in particular downstream of the heat sink of the condenser.

According to another aspect of the invention, a method is proposed for purifying, by reverse osmosis, a liquid, called liquid to be treated, in particular salt water, comprising at least one iteration of the following steps:
    pressurizing the liquid to be treated, and
    providing said pressurized liquid to be treated to a reverse osmosis treatment module providing a first liquid, called purified liquid and a second liquid, called residual liquid;
characterized in that the pressurizing step is carried out by at least one cylinder, called slave cylinder, firmly connected to a cylinder, called master cylinder with a cross section larger than the cross section of said slave cylinder, and receiving a working fluid.

Advantageously, the treatment module can be a module for treating liquid to be treated by reverse osmosis or by nanofiltration.

In an embodiment version of the method according to the invention, the master cylinder can be a double-acting cylinder, and can drive two slave cylinders so that, when one of the slave cylinders is emptied of liquid to be treated, the other slave cylinder is simultaneously filled with liquid to be treated.

In an embodiment, the method according to the invention can comprise a step of pre-pressurizing the liquid to be treated, before the step of pressurizing the liquid to be treated, carried out by a cylinder, called slave cylinder, containing the liquid to be treated, firmly connected to at least one cylinder, called master cylinder, receiving the residual liquid.

In an embodiment of the method according to the invention, the working fluid can be a compressible fluid, for example air, said method comprising a step of increasing the pressure of said working fluid by compression.

In an embodiment version of the method according to the invention, the working fluid can be a thermal fluid, said method comprising a step of increasing the pressure of said working fluid by heat exchange.

In a preferred version of the method according to the invention, the working fluid can be an incompressible fluid, said method comprising the following steps:
    a step of heat exchange towards a thermal fluid in order to increase the pressure of said thermal fluid, and
    a step of transferring pressure from said thermal fluid to said working fluid.

Advantageously, the pressure transfer step can be carried out by at least one cylinder containing the working fluid and an elastic bladder, arranged in said cylinder, and containing the thermal fluid.

In an embodiment, the method according to the invention can comprise a step of pre-pressurizing the thermal fluid carried out by a cylinder, called slave cylinder, containing the thermal fluid, firmly connected to at least one cylinder, called master cylinder, receiving the residual liquid.

In an embodiment version, the method according to the invention can comprise two half cycles, each half cycle comprising the following phases:
    a phase I simultaneously comprising:
        a step of increasing the pressure of the thermal fluid by heat exchange,
        a step of transferring pressure from said thermal fluid to said working fluid;
    a phase II simultaneously comprising:
        a step of increasing the pressure of the thermal fluid by heat exchange,
        a step of transferring pressure from said thermal fluid to said working fluid,
        a step of pressurizing the liquid to be treated,
        a step of purifying the liquid to be treated by reverse osmosis,
        a step of pre-pressurizing the thermal fluid;
    a phase III simultaneously comprising:
        a step of increasing the pressure of the thermal fluid by heat exchange,
        a step of transferring pressure from said thermal fluid to said working fluid,
        a step of pressurizing the liquid to be treated,
        a step of purifying the liquid to be treated by reverse osmosis; and
        a step of pre-pressurizing the liquid to be treated; and
    a phase IV comprising a step of pre-pressurizing the liquid to be treated.

In particular, the phases II and III can succeed each other in this order during a half cycle of the method.

Alternatively, the phases III and II can succeed each other in this order during a half cycle of the method.

BRIEF DESCRIPTION OF THE DRAWINGS

Other advantages and characteristics will become apparent on examining the detailed description of examples which are in no way limitative and the attached drawings, in which.

DETAILED DESCRIPTION

It is well understood that the embodiments which will be described hereafter are in no way limitative. Variants of the invention can in particular be envisaged, comprising only a selection of the characteristics described hereafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined with each other if there is no objection to this combination from a technical point of view.

In the figures, the elements common to several figures retain the same reference.

Figure 1:
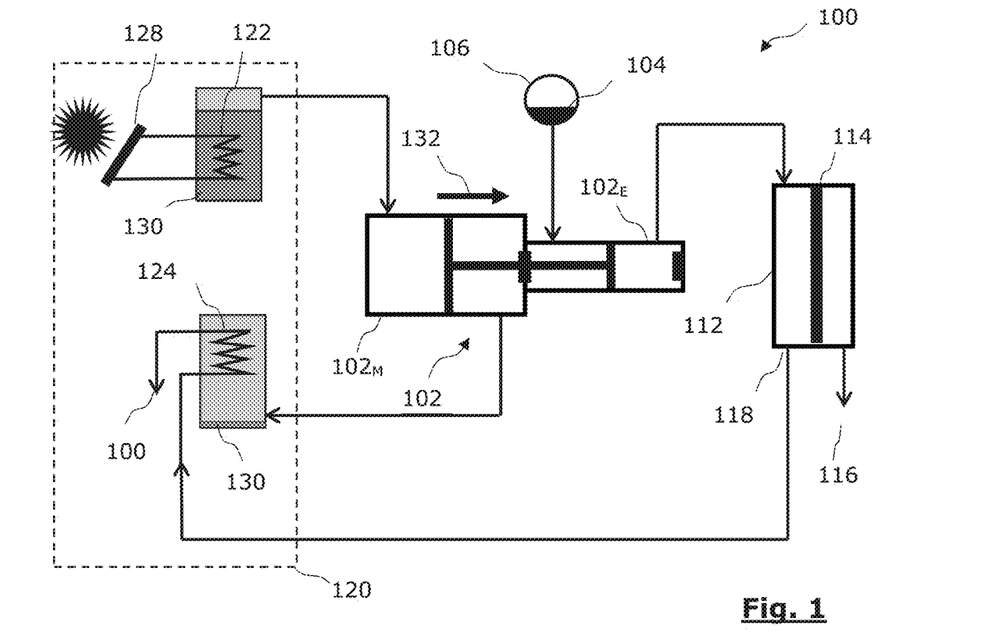
FIG. 1 is a diagrammatic representation of a first example of the system according to the invention.

FIG. 1 is a diagrammatic representation of a first example of the system according to the invention.

The system 100 of FIG. 1 comprises a means 102 for pressurizing liquid to be treated 104, originating from a source 106.

The pressurizing means 102 comprises a master cylinder $102_M$ driving a slave cylinder $102_E$, containing the liquid to be treated 104. The master cylinder $102_M$ has a cross section larger than the cross section of the slave cylinder $102_E$. When the slave cylinder $102_E$ is driven by the master cylinder $102_M$, the liquid to be treated 104 is pressurized and conveyed towards a reverse osmosis treatment module 112.

The treatment module 112 comprises a membrane 114, making it possible to produce a purified liquid at the outlet 116 and a residual liquid at the outlet 118 of said module 112.

The system 100 also comprises a thermal device 120 connected to the pressurizing means 102. The thermal device comprises an evaporator 122 and a condenser 124. The evaporator 122 is connected to a solar thermal collector 128 inducing the evaporation of a thermal fluid 130 which is a working fluid in this example. The condenser 124 is cooled by the residual liquid at the outlet 118 of the treatment module 112, inducing the condensation of the thermal fluid 130.

The difference in pressure induced by the evaporator 122 and the condenser 124 leads to the movement of the master cylinder $102_M$ in the direction 132.

Figure 2:
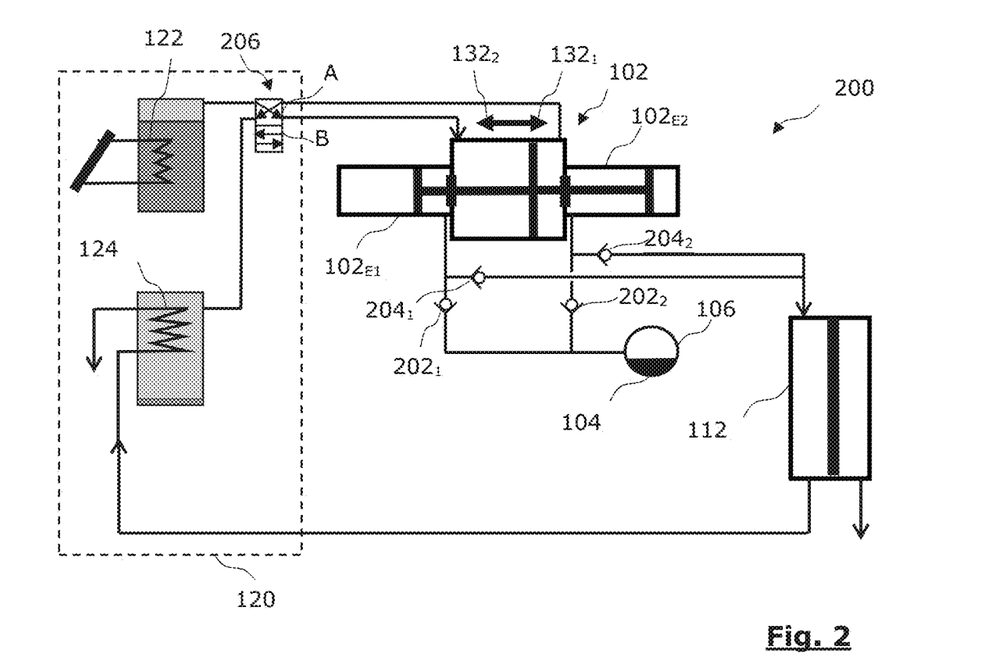
FIG. 2 is a diagrammatic representation of a second example of the system according to the invention.

FIG. 2 is a diagrammatic representation of a second example of the system according to the invention.

The system 200 comprises the same elements as the system 100 of FIG. 1. Unlike the latter, the means 102 for pressurizing the system 200 comprises two slave cylinders $102_{E1}$-$102_{E2}$. Furthermore, the master cylinder $102_M$ is a double-acting cylinder. Thus, each of the two slave cylinders 102E can be driven by the master cylinder $102_M$ in two opposite directions $132_1$-$132_2$.

Each of the slave cylinders $102_{E1}$ and $102_{E2}$ is equipped with a suction valve $202_1$ and $202_2$ respectively and with a delivery valve $204_1$ and $204_2$ respectively. The suction valves 202 are connected to the source 106 of liquid to be treated 104, in order to supply the slave cylinders $102_E$. The delivery valves 204 are connected to the treatment module 112, supplying the latter with pressurized liquid to be treated 104.

The master cylinder $102_M$ is connected to the thermal device 120 by means of a distributor 206. The distributor 206 in position A makes it possible to connect the evaporator 122 to a chamber called left-hand chamber of the master cylinder $102_M$ and the condenser 124 is connected to a chamber called right-hand chamber of the master cylinder $102_M$, and vice versa when the distributor 206 is in position B.

When the distributor 206 is in position A:
the master cylinder $102_M$ moves in the direction $132_1$,
the slave cylinder $102_{E2}$ is filled with liquid to be treated 104 through the suction valve $202_2$, and
the slave cylinder $102_{E1}$ pressurizes the liquid to be treated 104 and sends it to the treatment module 112 through the delivery valve $204_1$.

Conversely, when the distributor 206 is in position B:
the master cylinder $102_M$ moves in the direction $132_2$,
the slave cylinder $102_{E1}$ is filled with liquid to be treated 104 through the suction valve $202_1$, and
the slave cylinder $102_{E2}$ pressurizes the liquid to be treated 104 and sends it to the treatment module 112 through the delivery valve $204_2$.

Figure 3:
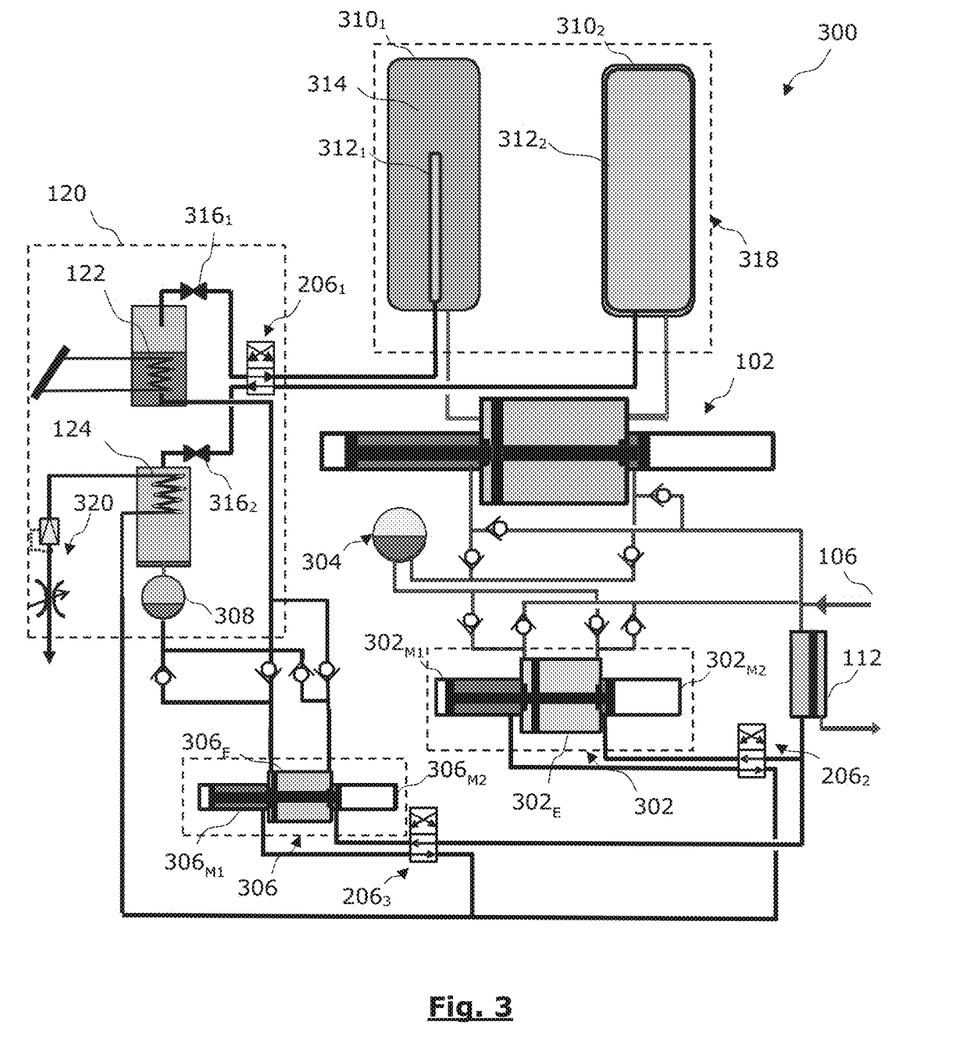
FIG. 3 is a diagrammatic representation of a third example of the system according to the invention.

FIG. 3 is a diagrammatic representation of a third example of the system according to the invention.

The system 300 of FIG. 3 comprises the same elements as the system 200 of FIG. 2.

The system 300 also comprises a means 302 for pre-pressurizing the liquid to be treated 104. The pre-pressurizing means 302 comprises two master cylinders $302_{M1}$-$302_{M2}$ driving a slave cylinder $302_E$ containing the liquid to be treated 104. The master cylinders $302_M$ are alternately connected to the outlet 118 of the treatment module 112 and to the condenser 124, by means of a distributor $206_2$. The master cylinders $302_M$ are alternately driven by the residual liquid as a function of the position (A or B) of the distributor $206_2$. When the slave cylinder $302_E$ is driven by a master cylinder $302_M$, it simultaneously pre-pressurizes the liquid to be treated 104 and is again filled with liquid to be treated 104. The pre-pressurized liquid to be treated 104 is stored in a reservoir 304 at an intermediate pressure greater than the pressure at the source 106 of the liquid to be treated 104.

The reservoir 304 is connected to the pressurizing means 102 and provides the slave cylinders $102_E$ with pre-pressurized liquid to be treated 104.

The system 300 also comprises a means 306 for pressurizing the thermal fluid 130. The pressurizing means 306 comprises two master cylinders $306_{M1}$-$306_{M2}$ driving a slave cylinder $306_E$ containing the thermal fluid 130. They are alternately connected to the outlet 118 of the treatment module 112 and to the condenser 124, by means of a distributor $206_3$. The slave cylinder $306_E$ is connected to a reservoir 308 containing thermal fluid 130 condensed by the condenser 124.

The master cylinders $306_M$ are alternately driven by the residual liquid as a function of the position (A or B) of the distributor $206_3$. When the slave cylinder $306_E$ is driven by a master cylinder $306_M$, it pre-pressurizes the thermal fluid 130 and is again filled with thermal fluid 130. The pre-pressurized thermal fluid 130 is transferred into the evaporator 122.

The system 300 comprises a pressure transfer means 318 arranged upstream of the pressurizing means 102 and of the thermal device 120. The transfer means 318 comprises two pressure transfer cylinders $310_1$-$310_2$. Each cylinder $310_1$-$310_2$ comprises an elastic bladder, $312_1$ and $312_2$ respectively. The cylinders 310 are connected to the master cylinder $102_M$ of the pressurizing means 102. In particular, the cylinder $310_1$ is connected to the left-hand chamber of the master cylinder $102_M$ and the cylinder $310_2$ is connected to the right-hand chamber of the master cylinder $102_M$. The transfer cylinders 310 contain an incompressible driving liquid 314, that can be transferred into the master cylinder $102_M$ in order to produce the movement thereof. The bladders 312 are connected to the thermal device 120 by means of a distributor $206_1$. The bladders 312 are alternately connected to the evaporator 122 and the condenser 124. Furthermore, valves $316_1$-$316_2$ are arranged downstream of the evaporator 122 and the condenser 124 respectively. The valves 316 make it possible to isolate or to connect the evaporator 122 and the condenser 124 to one of the bladders 312.

The bladders 312 contain the thermal fluid 130. The bladders 310 are deformed as a function of the pressure of the thermal fluid 130. The deformation of one of the bladders 312 induces the movement of the working fluid 314 present in one of the cylinders 310 and thus the movement of the master cylinder $102_M$.

Moreover, the system 300 comprises a device for adjusting the flow rate 320 of residual liquid. This adjustment device 320 comprises a valve that can be adjusted upstream of a downstream pressure reducer. The device for adjusting the flow rate 320 makes it possible to control the speed of the movements of the cylinders $302_M$ and $306_M$.

Figure 4:
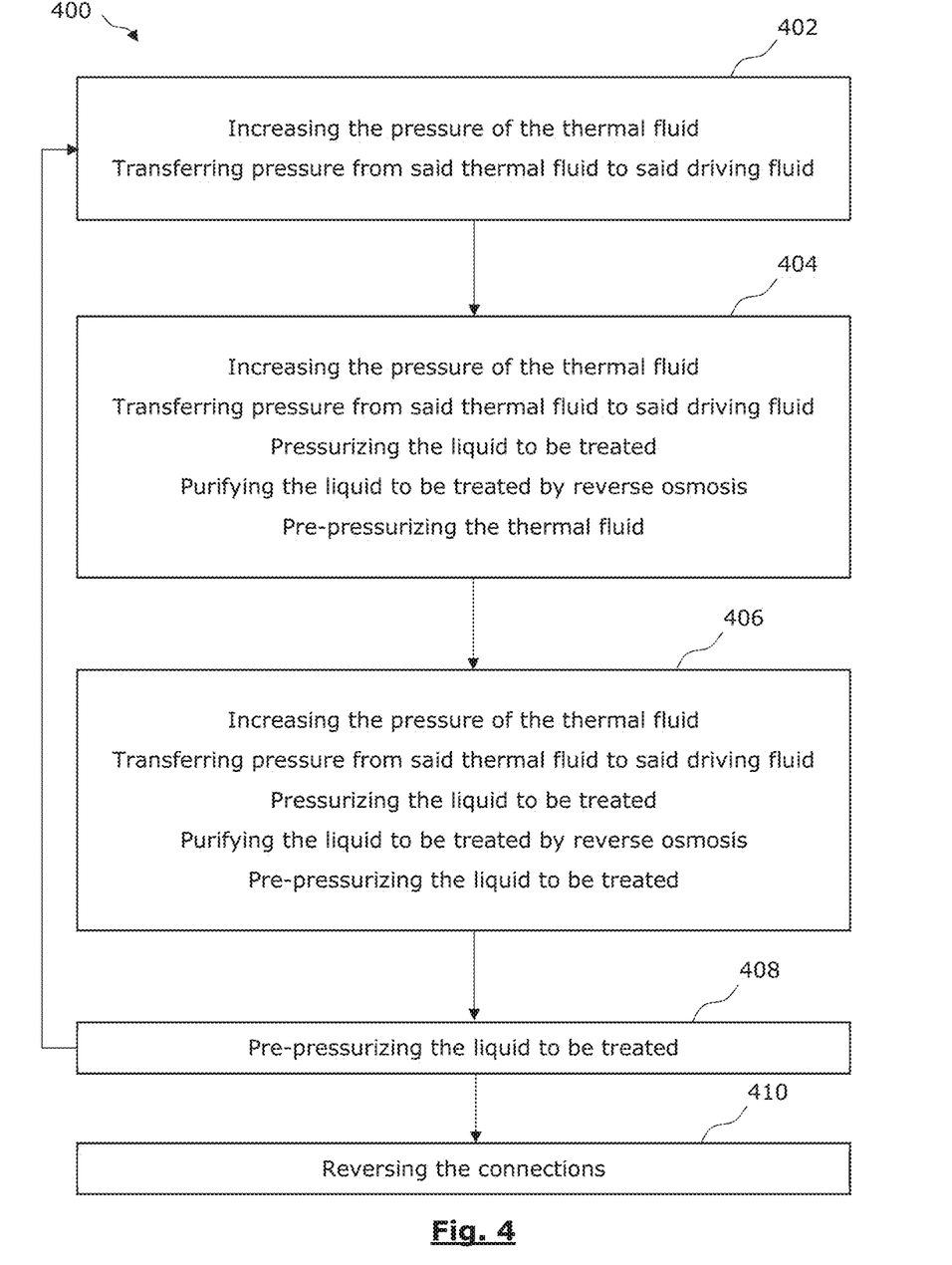
FIG. 4 is a diagrammatic representation of an example of the method according to the invention.

FIG. 4 is a diagrammatic representation of an example of the method according to the invention.

The method 400 can be implemented, for example by the system 300 of FIG. 3.

The method 400 comprises two half cycles, identical in their execution and for which the role of the transfer cylinders 310 is reversed.

Each half cycle simultaneously comprises a phase 402 comprising a step of increasing the pressure of the thermal fluid by heat exchange and a step of transferring pressure from said thermal fluid to said working fluid.

A half cycle of the method 400 then comprises a phase 404 simultaneously comprising the following steps:
increasing the pressure of the thermal fluid by heat exchange,
transferring pressure from said thermal fluid to said working fluid,
pressurizing the liquid to be treated,
purifying the liquid to be treated by reverse osmosis, and
pre-pressurizing the thermal fluid.

A half cycle of the method 400 then comprises a phase 406 which simultaneously consists of:
increasing the pressure of the thermal fluid by heat exchange,
transferring pressure from said thermal fluid to said working fluid,
pressurizing the liquid to be treated,
purifying the liquid to be treated by reverse osmosis, and
pre-pressurizing the liquid to be treated.

Each half cycle of the method comprises a phase 408 comprising a step of pre-pressurizing the liquid to be treated.

A half cycle of the method 400 ends with a step 410 of reversing the connections in order to carry out a second half cycle reversing the roles of the transfer cylinders.

FIGS. 5a, 5b, 5c and 5d are diagrammatic representations of the example of the method according to the invention implemented by the third example of the system according to the invention.

FIGS. 5a, 5b, 5c and 5d respectively represent the phases 402, 404, 406 and 408 of the method 400 of FIG. 4.

Figure 5A:
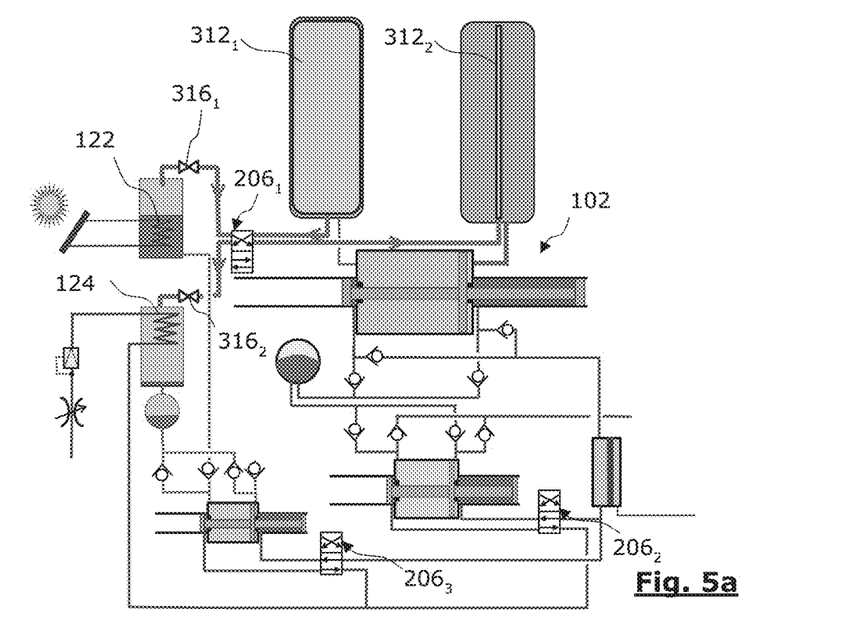
FIGS. 5a, 5b, 5c and 5d are diagrammatic representations of the example of the method according to the invention implemented by the third example of the system according to the invention.

In the phase 402 represented in FIG. 5a, the distributor $206_1$ is in position A, while the distributors $206_2$ and $206_3$ are in position B. The valves 316 are open. The bladders $312_1$ et $312_2$ are connected to the condenser 124 and to the evaporator 122 respectively. Due to the evaporation of the thermal fluid 130 in the evaporator, the pressure and thus the volume of the bladder $312_2$ increase. Conversely, the pressure and the volume of the bladder $312_1$ are reduced by condensation of the thermal fluid 130 in the condenser 124. The pressurizing of the bladders 312 induces the movement of the driving liquid 314 and thus the pressurizing of the master cylinder $102_M$ of the pressurizing means 102.

Figure 5B:
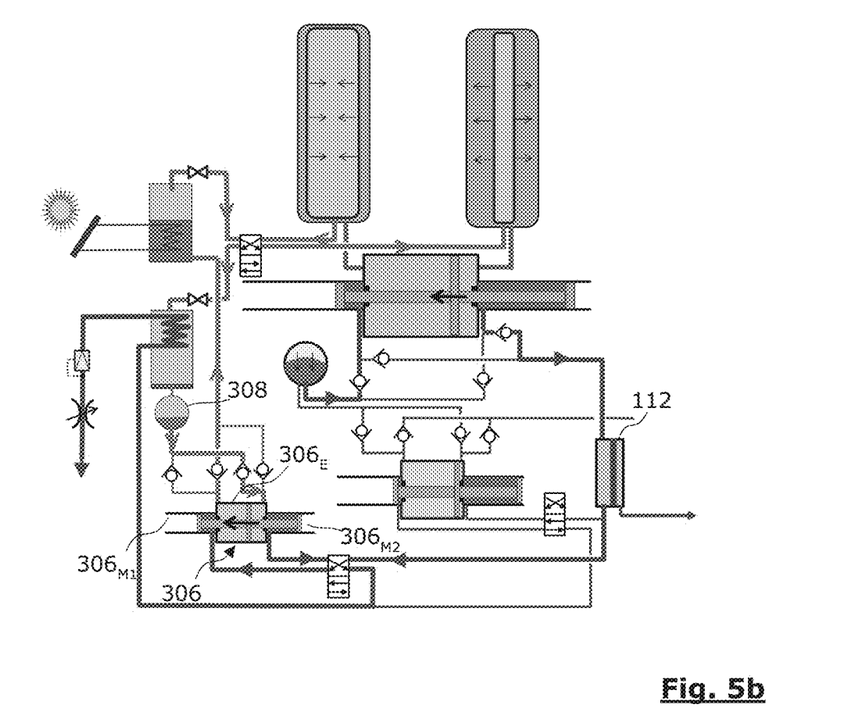

In the phase 404 represented in FIG. 5b, the distributor $206_3$ is placed in position A. This arrangement allows the flow of the liquid to be treated 104 in the system 300, in particular the movement of the master cylinder $102_M$ in the direction $132_2$ and thus the pressurizing of the liquid to be treated 104 by the pressurizing means 102.

The liquid to be treated 104 at the outlet of the pressurizing means 102 has a pressure greater than its osmotic pressure. The treatment module 112 thus produces fresh water. The residual liquid at the outlet 118 of the treatment module 112 drives the master cylinder $306_{M1}$. The master cylinder $306_{M1}$ drives with it the slave cylinder $306_E$ and the other master cylinder $306_{M2}$. The slave cylinder $306_E$ pre-pressurizes the thermal fluid 130 and transfers it into the evaporator 122 and again sucks in a quantity of the thermal fluid 130 from the reservoir 308. The other master cylinder $306_{M2}$ drives the residual liquid that it contained towards the condenser 124 in order to cool it. This phase 404 ends when the master cylinder $306_{M1}$ is in its end position.

Figure 5C:
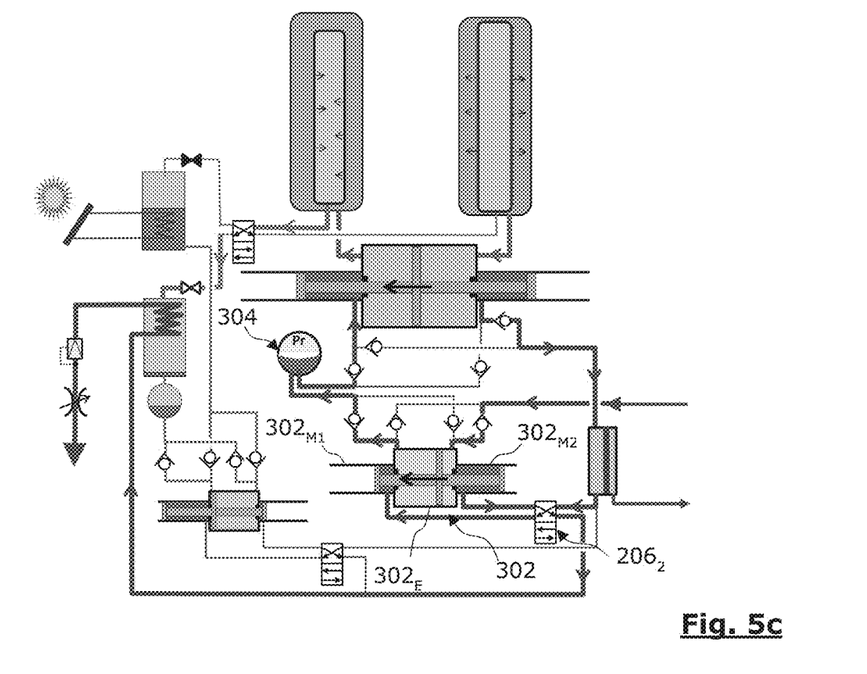

In the phase 406 represented in FIG. 5c, the distributor $206_2$ is placed in position A. This arrangement allows the flow of the liquid to be treated 104 in the system 300; in particular the movement of the master cylinder $102_M$ and thus the pressurizing of the liquid to be treated 104 by the pressurizing means 102.

The liquid to be treated 104 at the outlet of the pressurizing means 102 has a pressure greater than its osmotic pressure. The treatment module 112 continues to produce fresh water. The residual liquid at the outlet 118 of the treatment module 112 drives the master cylinder $306_{M1}$ of the pre-pressurizing means 302. The master cylinder $306_{M1}$ drives with it the slave cylinder $306_E$ and the other master cylinder $306_{M2}$. The slave cylinder $306_E$ pre-pressurizes the liquid to be treated 104 that it contained and transfers it into the reservoir 304 at a pressure slightly less than its osmotic pressure, and again sucks in a quantity of liquid to be treated 104. Simultaneously, the master cylinder $306_{M1}$ drives the residual liquid that it contained towards the condenser 124 in order to cool it. This phase 406 ends when the volume of the bladder $312_2$ reaches a volume allowing an adiabatic expansion.

Figure 5D:
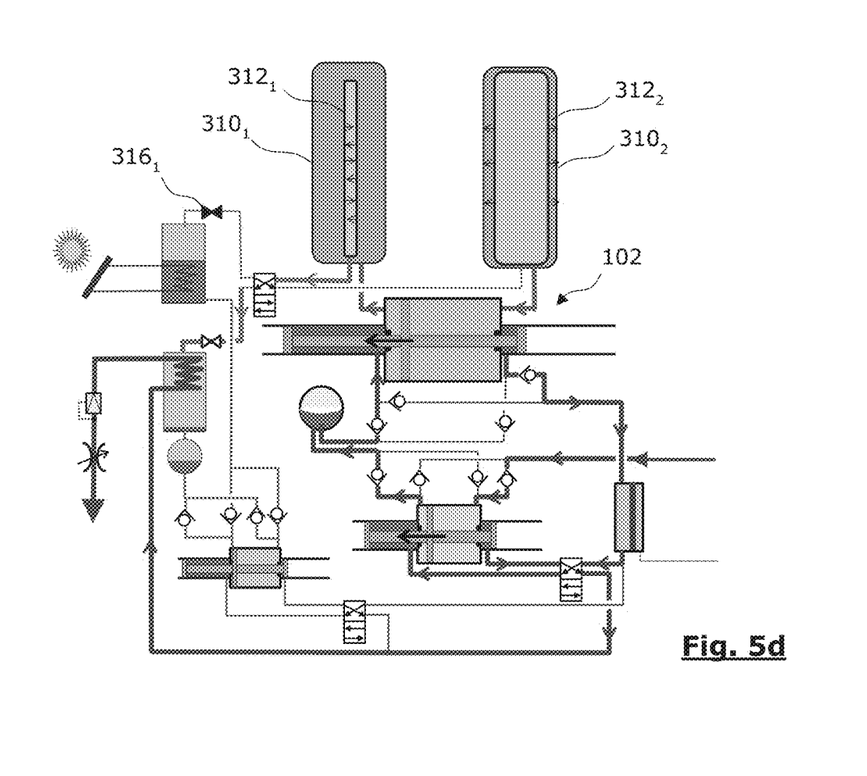

Finally, in the phase 408 represented in FIG. 5d, the valve $316_1$ is closed, thus isolating the bladder $312_2$ from the evaporator 122. The bladder $312_2$ containing a constant volume of thermal fluid 130 undergoes an adiabatic expansion so as to occupy the entire volume of the cylinder $310_2$. This expansion allows the continuity of the movement of the master cylinder $102_M$ and thus the pressurizing of the liquid to be treated 104 and the production of fresh water. Moreover, the master cylinder $302_{M1}$ continues to be driven by the residual liquid in order to pre-pressurize the liquid to be treated 104. This phase 408 ends when the master cylinders $102_M$ and $302_{M1}$ arrive in their end position.

Of course, the invention is not limited to the examples which have just been described and numerous adjustments can be made to these examples without exceeding the scope of the invention.

The invention claimed is:

1. A system for purifying a liquid to be treated, comprising:
a module, called treatment module, for treating the liquid to be treated and providing a purified liquid, and a residual liquid; and a means for pressurizing the liquid to be treated to supply said treatment module, comprising:
  a cylinder, called a master cylinder, provided to be driven by a fluid, called a working fluid; and
  at least one cylinder, called a slave cylinder, driven by said master cylinder, provided to receive the liquid to be treated and supply the liquid to be treated to said treatment module;
a cross section of said master cylinder is greater than a cross section of said at least one slave cylinder so that, for a given pressure of said working fluid in the master cylinder, a greater pressure is generated on the liquid to be treated in the slave cylinder; and a means for pre-pressurizing the liquid to be treated, upstream of the pressurizing means; said pre-pressurizing means comprising:
  at least one cylinder, called a master cylinder, connected to the treatment module, and driven by the residual liquid provided by the treatment module; and
  a cylinder, called a slave cylinder, containing the liquid to be treated, driven by said at least one master cylinder.

2. The system according to claim 1, wherein the treatment module is a module for treating the liquid to be treated by reverse osmosis.

3. The system according to claim 1, wherein the master cylinder is a double-acting cylinder, and the pressurizing means comprises two slave cylinders, situated symmetrically on both sides of the master cylinder, and driven by said master cylinder.

4. The system according to claim 1, further comprising a reservoir, called intermediate reservoir, arranged to store the liquid to be treated at an intermediate pressure, less than an osmotic pressure, at an outlet of the means for pre-pressurizing the liquid to be treated and to supply the pressurizing means with the liquid to be treated.

5. The system according to claim 1, wherein the working fluid is a thermal fluid, a pressure of which varies as a function of a temperature of the working fluid, said system comprising a thermal device, arranged upstream of the pressurizing means, and carrying out a heat exchange towards said working fluid, so as to increase its pressure.

6. The system according to claim 1, wherein the working fluid is an incompressible fluid, said system comprising:
  a thermal device, arranged upstream of the pressurizing means, and carrying out a heat exchange towards a thermal fluid, so as to increase the pressure of said thermal fluid; and
  a pressure transfer means, arranged between said thermal device and the pressurizing means, to transmit the pressure from said thermal fluid to the working fluid.

7. The system according to claim 6, wherein the pressure transfer means comprises:
  at least one cylinder, called transfer cylinder, connected to the pressurizing means, and provided to receive the working fluid; and
  at least one deformable volume, arranged in said transfer cylinder, and provided to receive the thermal fluid.

8. The system according to claim 5, wherein the thermal fluid is a fluid selected from: saturated or unsaturated C5- to C10-type hydrocarbons, organic fluids or mixtures of azeotropic or non-azeotropic organic fluids.

9. The system according to claim 5, further comprising a thermal fluid pre-pressurizing means, arranged upstream of the thermal device.

10. The system according to claim 9, wherein the thermal fluid pre-pressurizing means comprises:
  at least one cylinder, called master cylinder, driven by the residual liquid provided by the treatment module; and
  a cylinder, called slave cylinder, containing the thermal fluid, driven by said at least one master cylinder.

11. A method for purifying a liquid, called a liquid to be treated, comprising at least one iteration of the following steps:
  pressurizing the liquid to be treated;
  supplying said pressurized liquid to be treated to a treatment module providing a first liquid, called a purified liquid, and a second liquid, called a residual liquid;
  the pressurizing step is carried out by at least one cylinder, called a slave cylinder, firmly connected to a cylinder, called a master cylinder, with a cross section larger than the cross section of said slave cylinder, and receiving a working fluid; and a step of pre-pressurizing the liquid to be treated, before the step of pressurizing the liquid to be treated, carried out by a cylinder, called slave cylinder, containing the liquid to be treated, firmly connected to at least one cylinder, called master cylinder, receiving the residual liquid.

12. The method according to claim 11, wherein the treatment module is a module for treating liquid to be treated by reverse osmosis.

13. The method according to claim 11, wherein the master cylinder is a double-acting cylinder, and drives two slave cylinders so that, when one of the slave cylinders is emptied of liquid to be treated, the other slave cylinder is simultaneously filled with liquid to be treated.

14. The method according to claim 11, wherein the working fluid is a thermal fluid, said method comprising a step of increasing the pressure of said working fluid by heat exchange.

15. The method according to claim 11, wherein the working fluid is an incompressible fluid, said method comprising the following steps:
  a step of heat exchange towards a thermal fluid in order to increase the pressure of said thermal fluid; and
  a step of transferring pressure from said thermal fluid to saidworking fluid.

16. The method according to claim 15, wherein the pressure transfer step is carried out by at least one cylinder containing the working fluid and an elastic bladder, arranged in said cylinder, and containing the thermal fluid.

17. The method according to claim 14, further comprising a step of pre-pressurizing the thermal fluid, carried out by a cylinder, called slave cylinder, containing the thermal fluid, firmly connected to at least one cylinder, called master cylinder, receiving the residual liquid.

18. The method according to claim 15, further comprising two half cycles, each half cycle comprising the following phases:
  a phase I simultaneously comprising:
    increasing the pressure of the thermal fluid by heat exchange; and
    transferring pressure from said thermal fluid to said working fluid;
  a phase II simultaneously comprising:
    increasing the pressure of the thermal fluid by heat exchange;
    transferring pressure from said thermal fluid to said working fluid;
    pressurizing the liquid to be treated;
    purifying the liquid to be treated by reverse osmosis; and pre-pressurizing the thermal fluid;
a phase III simultaneously comprising:
    increasing the pressure of the thermal fluid by heat exchange;
    transferring pressure from said thermal fluid to said working fluid;
    pressurizing the liquid to be treated;
    purifying the liquid to be treated by reverse osmosis; and
    pre-pressurizing the liquid to be treated; and
a phase IV comprising a step of pre-pressurizing the liquid to be treated.

19. The system according to claim 1, wherein said master cylinder and said slave cylinder each include a piston.

20. The method of claim 11, wherein said master cylinder and said slave cylinder each include a piston.

\* \* \* \* \*